(12) United States Patent  
Iwasaki

(10) Patent No.: US 9,319,594 B2
(45) Date of Patent: Apr. 19, 2016

(54) IMAGING DEVICE AND IMAGING METHOD

(71) Applicant: Olympus Corporation, Shibuya-ku, Tokyo (JP)

(72) Inventor: Hiroaki Iwasaki, Hino (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 14/590,266

(22) Filed: Jan. 6, 2015

(65) Prior Publication Data

US 2015/0207973 A1 Jul. 23, 2015

(30) Foreign Application Priority Data

Jan. 20, 2014 (JP) ................................. 2014-007621

(51) Int. Cl.
*H04N 5/235* (2006.01)
*H04N 5/243* (2006.01)

(52) U.S. Cl.
CPC ........... *H04N 5/2352* (2013.01); *H04N 5/2353* (2013.01); *H04N 5/2355* (2013.01); *H04N 5/243* (2013.01)

(58) Field of Classification Search
None
See application file for complete search history.

(56) References Cited

U.S. PATENT DOCUMENTS

| 8,023,004 B2 | 9/2011 | Asoma |
| 8,941,755 B2* | 1/2015 | Nikkanen ................. 348/223.1 |
| 2007/0085912 A1* | 4/2007 | Hakola et al. ............. 348/227.1 |
| 2007/0120997 A1* | 5/2007 | Sasaki et al. .................. 348/362 |
| 2009/0161929 A1* | 6/2009 | Oba et al. ...................... 382/128 |
| 2010/0073516 A1* | 3/2010 | Minakuti et al. ........... 348/229.1 |
| 2012/0002098 A1* | 1/2012 | Ueda ............................. 348/362 |

FOREIGN PATENT DOCUMENTS

| JP | 2003-283923 | 10/2003 |
| JP | 2013-183380 | 9/2013 |

* cited by examiner

*Primary Examiner* — Shahbaz Nazrul
(74) *Attorney, Agent, or Firm* — John C. Pokotylo; Straub & Pokotylo

(57) ABSTRACT

An imaging device of the present invention comprises an additive combination for subjecting image data to additive combination, a gain application section for applying minus gain image data that has been subjected to additive combination by the additive combination section, an additive combination section for, at the time of imaging in the imaging section, respectively subjecting a plurality of image data, that have been acquired by divided exposure at the divided exposure time, to additive combination to create combined image data, and a gain application section for applying the minus gain to the combined image data to create taken image data.

20 Claims, 6 Drawing Sheets

IMAGING DEVICE AND IMAGING METHOD

Benefit is claimed, under 35 U.S.C. §119, to the filing date of prior Japanese Patent Application No. 2014-7621 filed on Jan. 20, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device and imaging method, in an imaging device such as a digital camera, capable of shooting a high brightness subject, and having a high degree of freedom for exposure conditions in order to obtain optimum exposure.

2. Description of the Related Art

In an imaging device such as a conventional digital camera, exposure control is carried out by changing aperture value, ISO sensitivity, shutter speed etc. A setting range for aperture value (generally represented by F number) is restricted to a limited range in order to maintain optical characteristics, such as lens MTF (Modulation Transfer Function: value relating to resolution). Lenses currently on the market generally have a range of about F1.0 to F22.

Also, a low sensitivity limit and a high sensitivity limit of ISO sensitivity is determined by characteristics of an image sensor, such as a CMOS image sensor or a CCD image sensor, and permissible image quality depending on camera specification.

In the case where a mechanical shutter has been adopted as the shutter, then from the viewpoint of the setting range for shutter speed (generally, represented as Tv value relating to the reciprocal of exposure time), with a shutter speed that gives a longer exposure time (small Tv value), dark current noise of the image sensor increases with longer shutter speed. Therefore, image quality is degraded by increasing dark current noise, and permissible time for shutter speed at a low speed end of the range is determined by a value relating to S/N ratio for image quality (value using ratio of correct signal components and noise components in an image signal) similar to the high sensitivity setting for ISO sensitivity. On the other hand, a setting range for shutter speed at the high-speed end is dependent on drive precision of a mechanical shutter. For example, in the case of a focal plane shutter, since there is variation in opening and closing speed of the two shutter curtains, namely the front curtain and the rear curtain, shutter speeds are currently limited to about 1/8000th of a second. Also, in the case where a lens shutter has been adopted as the shutter, the limit speed at the high-speed end is lower than with a focal plane shutter.

As mentioned above, there are respective limits for aperture value, ISO sensitivity and shutter speed for controlling exposure, and with combinations of aperture value, ISO sensitivity and shutter speed within the limit range there may be situations where a user, being a photographer, can not obtain the image they intended. Basically, in the case of shooting an image of high brightness, such as the sun, even if the aperture is closed down to F22 and ISO sensitivity set to the lowest sensitivity, and shutter speed set to the highest speed, there may be situations where the taken image still has blown out highlights.

In the case of shooting this type of high brightness subject, the conventional approach has been to adopt an ND (neutral density) filter, and shoot with correct exposure by reducing light amount incident on the image sensor. Since fitting an ND filter to a camera lens is troublesome, there has also been proposed a digital camera that has an ND filter built into an incident light path within the camera, and is capable of inserting or retracting the ND filter in front of the image sensor as required (refer to Japanese patent laid-open No. 2003-283923 (hereafter referred to as patent publication 1)). There has also been proposed an image sensor that is capable of shooting with effectively lowered sensitivity, by eliminating some electrical charge signals that have been photoelectrically converted by photodiodes of the image sensor, in order to carry out shooting with effectively reduced sensitivity without using an ND filter (refer to Japanese patent laid-open number 2013-183380 (hereafter referred to as patent publication 2)).

SUMMARY OF THE INVENTION

An imaging device of the present invention comprises an imaging section, including an image sensor for forming a subject image and outputting image data, a saturation determination section for, in the case where imaging has been carried out under conditions that have been set for actual exposure, determining whether or not pixel output of at least some of the image data is saturated, a divided exposure time detection section for, in the event that it has been determined by the saturation determination section that at least some pixel outputs are saturated, detecting a divided exposure time at which the pixel outputs will not be saturated, and an image processing section for applying image processing to image data that has been acquired by the imaging section, wherein the image processing section is provided with an additive combination section for carrying out additive combination of image data, and a gain application section for applying minus gain to image data that has been subjected to additive combination by the additive combination section, and the additive combination section, at the time of imaging in the imaging section, respectively additively combines a plurality of image data, that have been acquired by divided exposure at the divided exposure time, to generate combined image data, and the gain application section applies minus gain to the combined image data to generate taken image data.

Further, an imaging device of the present invention comprises an imaging section, including an image sensor for forming a subject image and outputting image data, a saturation determination section for, in the case where imaging has been carried out under conditions that have been set for actual exposure, determining whether or not pixel output of at least some of the image data is saturated, a divided exposure time detection section for, in the event that it has been determined by the saturation determination section that at least some pixel outputs are saturated, detecting a divided exposure time at which the pixel outputs will not be saturated, and an image processing section for applying image processing to image data that has been acquired by the imaging section, wherein the image processing section is provided with a gain application section for applying minus gain to respective divided exposure image data that has been imaged at the divided exposure time detected by the divided exposure time detection section, and an additive combination section for subjecting the divided exposure image data, that has had minus gain applied by the gain application section, to additive combination, and the additive combination section, at the time of imaging in the imaging section, additively combines the image data have been acquired by dividing exposure at the divided exposure time, after minus gain has been respectively applied by the gain application, to generate subject image data.

Also, an imaging method of the present invention comprises an image forming step that forms a subject image using an image sensor and outputting image data, a saturation determination step, in the case where imaging has been carried out under conditions that have been set for actual exposure, that determines whether or not pixel output of at least some of the image data is saturated, a divided exposure time detection step, in the event that it has been determined in the saturation determination step that at least some pixel outputs are saturated, that detects a divided exposure time at which the pixel outputs will not be saturated, and an image processing step that applies image processing to image data that has been acquired in the imaging step, wherein the image processing step is provided with an additive combination step that carries out additive combination of image data, and a gain application step that applies minus gain to image data that has been subjected to additive combination in the additive combination step, and the additive combination step further subjects divided exposure image data, that have been acquired by a plurality of divided exposures obtained by divided exposure at the divided exposure time in the imaging step, to additive combination to generate combined image data, and applies minus gain to the image data after additive combination to create taken image data.

Also, an imaging method of the present invention comprises an image forming step that forms a subject image using an image sensor and outputting image data, a saturation determination step, in the case where imaging has been carried out under conditions that have been set for actual exposure, that determines whether or not pixel output of at least some of the image data is saturated, a divided exposure time detection step, in the event that it has been determined in the saturation determination step that at least some pixel outputs are saturated, that detects a divided exposure time at which the pixel outputs will not be saturated, and an image processing step that applies image processing to image data that has been acquired in the imaging step, wherein the image processing step is provided with a gain application step that applies minus gain to image data, and an additive combination step that carries out additive combination of image data, after having applied minus gain in the gain application step, and the additive combination step, at the time of the imaging step, performs additive combination of image data that have been acquired by dividing exposure at the divided exposure time and to which minus gain has been respectively applied.

DETAILED DESCRIPTION OF THE PREFERRED EMBODIMENTS

Preferred embodiments using a camera to which the present invention has been applied will be described in the following in accordance with the drawings. A camera of a preferred embodiment of the present invention is a digital camera, and, in summary, subjects image data to live view display on a display section on the basis of image signals read out from an image sensor, and also stores image data that has been subjected to image processing for storage in external memory in response to operation of a release button.

Also, in the event that digital ND mode has been set in the shooting settings of the camera, then at the time of shooting with the shutter speed that has been set, shooting is carried out with divided exposure in the case of high brightness, and additive combination of each image that has been acquired through the divided exposure is carried out. Also, similarly, in the event that extended low ISO mode has been set manually or automatically in the shooting settings of the camera, then in the case where saturation of image output arises at the lowest ISO sensitivity (namely when blown out highlights occur), shooting is carried out with divided exposure, and additive combination of each image acquired by the divided exposure is carried out. Is in this way, it is possible to prevent some pixels becoming saturated due to the subject brightness being extremely bright, and thus prevent images with blown out highlights.

Specifically, in a case where shooting has been performed by the user carrying out digital ND mode setting (neutral density processing setting) by means of the input IF (interface), minus gain is applied to image data to obtain a neutral density shooting effect equivalent to that of an ND filter. Further, it is determined by the saturation determination section whether output of image data is saturated, and in the case of saturation additive combination of a plurality of images taken by divided exposure at a high shutter speed that does not result in saturation is carried out, and an image with no image disruption is generated by applying minus gain. Similar processing is also carried out in the case where extended low ISO mode has been set manually or automatically. Normal gain is a value of 1 or more, and the gain application section multiplies the original data by this gain. Since gain is 1 or more, the original data is larger after gain application. On the other hand, minus gain is of value between 0 and less than 1 (for example ½, ¼, 18 etc.). If the gain application section performs gain application using minus gain, therefore, original data becomes smaller after gain application.

Figure 1:
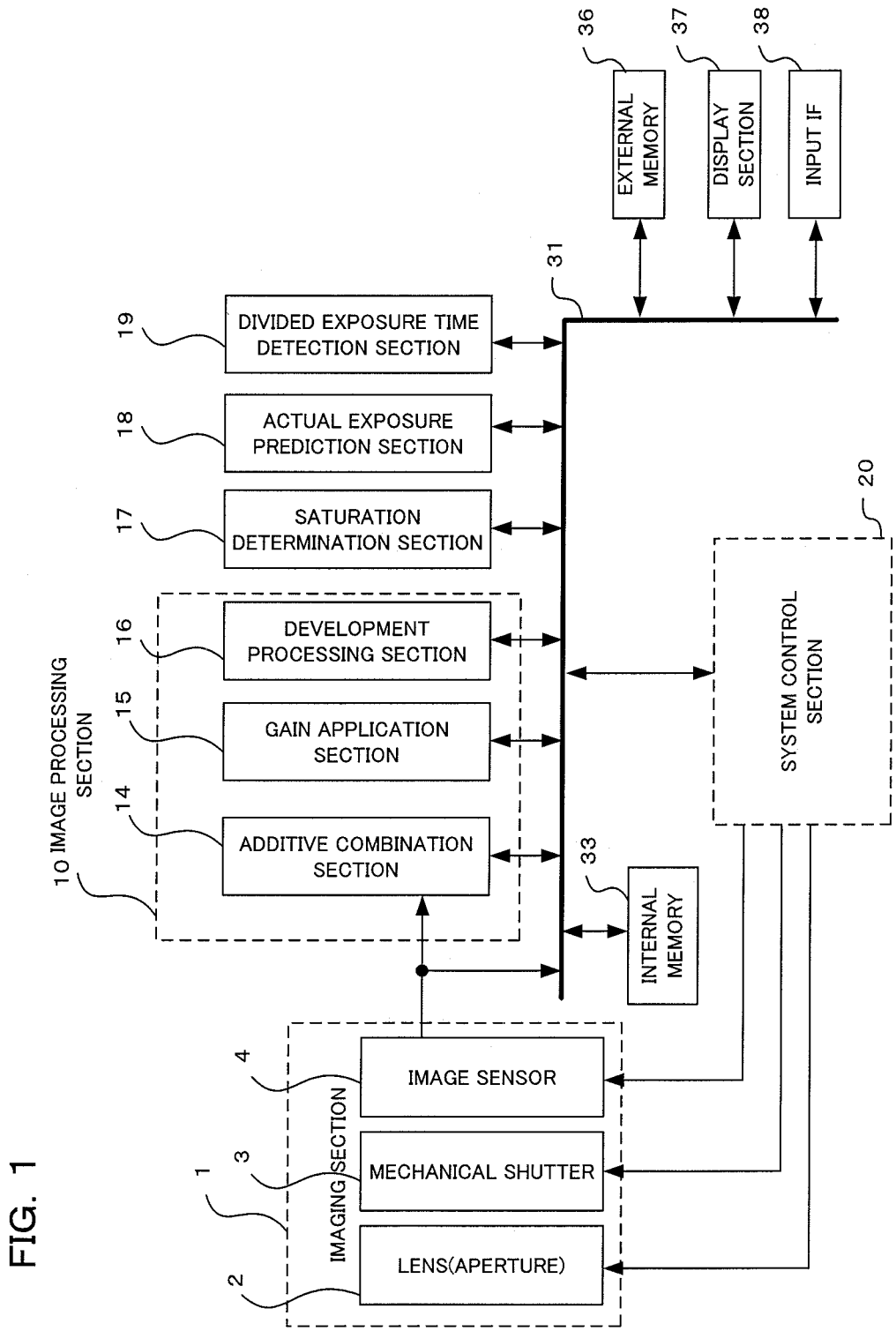
FIG. 1 is a block diagram mainly showing the electrical structure of a digital camera of a first embodiment of the present invention.

FIG. 1 is a block diagram mainly showing the electrical structure of a camera of a first embodiment of the present invention. The camera of this embodiment comprises an imaging section 1, an image processing section 10, system control section 20 and a bus 31, with each section being connected to this bus. With this embodiment, a lens 21 included in the imaging section 1 is constructed integrally with the camera body. However, the configuration is not limited to an integrated construction, and it is also possible, for example, to have an interchangeable lens that corresponds to an interchangeable lens camera.

Inside the imaging section 1 there are a lens 2, mechanical shutter 3 and image sensor 4. The lens 2 forms an optical image of the subject on the image sensor 4. An aperture for adjusting aperture value in order to adjust exposure amount is provided inside this lens 2. Also, a mechanical shutter 3 exposes or shields light to the image sensor 4 by an opening and closing operation, and controls shutter speed. The image sensor 4 includes an image sensor such as a CMOS image sensor or a CCD image sensor, and converts an optical image of a subject that has been formed by the lens 2 into electrical signals for every pixel, before outputting image signals to the image processing section 10 and the bus 31. The bus 31 is a signal line for exchanging signals between each block.

The image processing section 10 subjects image signals output from the image sensor 4 to image processing, and comprises an additive combination section 14, gain application section 15 and a development processing section 16.

The additive combination section 14 adds outputs for every respectively corresponding pixel, within a plurality of image data that has been read out from the image sensor 4, to generate added combination data. Specifically, image data is read out from the image sensor 4 after completion of each divided exposure using divided exposure, and after completion of all of the divided exposures image data for each corresponding pixel is added by the additive combination section 14 and added combination data are generated.

The gain application section 15 multiplies image data by a specified minus gain value. For example, by multiplying by a gain value of ½, as a minus gain setting, image data output becomes ½, and it is possible to apply a neutral density effect equivalent to that of an ND2 filter (a filter that reduces light amount to ½). Also, if the digital ND setting value is ND8, for example, image data is multiplied by ⅛. The minus gain value can be set by the user by means of the input IF 38 etc. In this way it is possible for the gain application section 15 to realize a so-called neutral density effect.

The development processing section 16 carries out development processing such as demosaicing, white balance adjustment, gamma correction and image compression etc. on RAW image data (image data before development processing, which will be described later) that has been generated by the additive combination section 14.

The saturation determination section 17 determines whether or not image data output has reached a saturation level. Saturation level is determined using saturation output for number of bits of raw image data. The saturation determination section 17 functions as a saturation determination section for determining whether or not at least some pixel output of image data is saturated, when a picture has been taken and the shooting conditions set for actual exposure.

An actual exposure time prediction section 18 calculates a predicted value for optimum exposure settings, such as ISO sensitivity, aperture value, exposure time (shutter speed) etc., in accordance with brightness information of camera image data. With this embodiment, an example is shown of optimal exposure setting at the time of actual exposure, based on image data that has been obtained using the image sensor 4 in a live view shooting state. However, this is not limiting, and it is also possible, for example, that uses a photometric sensor instead of the image sensor 4 for image output. At the time of actual exposure or at the time of actual shooting means exposure or shooting that is carried out when the release button is pressed down fully (refer to S17 and S31 in FIG. 3).

The divided exposure time detection section 19 carries out determination of exposure time (shutter speed) at which image data from the image sensor 4 is not saturated, in the event that the saturation determination section 17 has determined that pixel outputs of the image data are saturated. Specifically, the divided exposure time detection section 19 functions as a divided exposure time detection section, for detecting divided exposure time at which pixel outputs of the image sensor are not saturated, in the event that at least some of the pixel outputs have been determined by the saturation determination section to be saturated.

The bus 31 is connected to an internal memory 33, external memory 36, display section 37, input IF 38 and system control section 20, as well as to the previously described imaging section 1, image processing section 10, saturation determination section 17, actual exposure time prediction section 18 and divided exposure time detection section 19.

The internal memory 33 temporarily stores various setting information required in camera operation, and image data currently being processed at the time of image processing. The internal memory 33 is constituted by an electrically rewritable nonvolatile memory such as flash memory or DRAM.

An external memory 36 is a non-volatile storage medium that can be removed from the camera body or is fixed inside the camera, such as, for example an SD card or a CF card. This external memory 36 stores image data that has been subjected to processing by the development processing section 16, and at the time of playback it is possible to read stored image data and output outside the camera.

The display section 37 is a rear surface display section such as a TFT (Thin Film Transistor) liquid crystal device or organic EL display deice, or an EVF (electronic viewfinder), and displays images that have been processed by the development processing section 16.

The input IF 38 has operating members such as a release button and a touch panel for inputting touch operations on a rear surface display section etc., and carries out various mode settings and instruction of exposure operation such as release, based on user operation.

The system control section 20 has a CPU (Central Processing Unit), and carries out overall control of the camera in accordance with programs stored in the internal memory 33. The system control section 20 transmits control signals to each part included in the imaging section 1 shown previously. Similarly, the system control section 20 also receives output signals from the imaging section 1 via the bus 31. As well as control signals to and from the imaging section 1, the system control section 20 transmits and receives control signals between each of the sections of the internal memory 33, external memory 36, display section 37 and input IF 38, as well as the previously shown image processing section 10, saturation determination section 17, actual exposure time prediction section 18 and divided exposure time detection section 19.

Also, if the light reduction setting (digital ND mode setting) has been performed by the user by means of the input IF 38, the system control section 20 determines whether or not the saturation determination section 17 has determined that there are pixels that are saturated in the event that shooting was carried out with a shutter speed, aperture value and ISO sensitivity at the time of actual shooting, based on image data that has been read out from the image sensor 4 for live view immediately prior to actual shooting.

If the saturation determination section 17 has determined that there are no pixels that are saturated, in the image data that has been read out, the system control section 20 performs shooting at the shutter speed and aperture value that have been set by the user. Also, at the time of digital ND setting, shooting is carried out at the ISO sensitivity that has been set by the user.

On the other hand, if the saturation determination section 17 determines that there are pixels that are saturated when shooting has been carried out with the shutter speed, aperture value and ISO sensitivity settings at the time of actual shooting, the system control section 20 causes the divided exposure time detection section 19 to detect a shutter speed at which image output is not saturated when shooting at the aperture setting value and ISO sensitivity setting value at the time of actual shooting, and causes this divided exposure to be carried out.

Specifically, the system control section 20 instructs the image sensor 4 to shoot at an electronic shutter speed that is faster than the shutter speed at the time of actual shooting. The saturation determination section 17 performs saturation determination on this taken image data, and on the basis of this determination result the divided exposure time detection section 19 detects a shutter speed at which there is no saturation. This divided exposure time setting is specifically setting a divided exposure time that is an integer reciprocal of the set shutter speed at the time of actual shooting, and an exposure time corresponding to a shutter speed that is shorter than or equal to a shutter speed at which there is no saturation.

At the time of actual shooting, shooting is carried out a plurality of times at the shutter speed for the divided exposure time that has been detected, and the aperture value and the set ISO sensitivity at the time of actual shooting. Specifically, in the case where set shutter speed at the time of actual shooting is 1/10th of a second, and the divided exposure time is 1/100th of a second, shooting is carried out 10 times ((1/10th of a second) ÷(1/100th of a second)). Image data for 10 images taken at this time is subjected to additive combination by the additive combination section 14, and then multiplied by minus gain by the gain application section 15. The minus gain value is the same as described above.

In a case where the divided exposure time that has been acquired using the divided exposure time detection section 19 is faster than the maximum shutter speed constituting the controllable limit value of a mechanical shutter 3 of the camera, divided exposure is carried out using an electronic shutter of the image sensor 4. Shutter speed of the electronic shutter can be controlled in time units of every input clock period (generally 10 MHz or higher) for generating reference timing required in control operations of the image sensor 4. Specifically, it is possible to control shutter speed to the order of about $10^{-7}$ seconds. If the maximum shutter speed of the mechanical shutter 3 is 1/8000th of a second, it is possible to shoot with a maximum shutter speed of 1/100,000,000, making it possible to shoot a subject with absolutely no saturation.

Also, if it is necessary to set a fast exposure time, it is possible for timing control of the electronic shutter, using an internal circuit of the image sensor 4, to be controlled with a faster clock by frequency dividing the period of the input clock signal. In this way, it becomes possible to carry out even faster divided exposure.

Figure 2A:
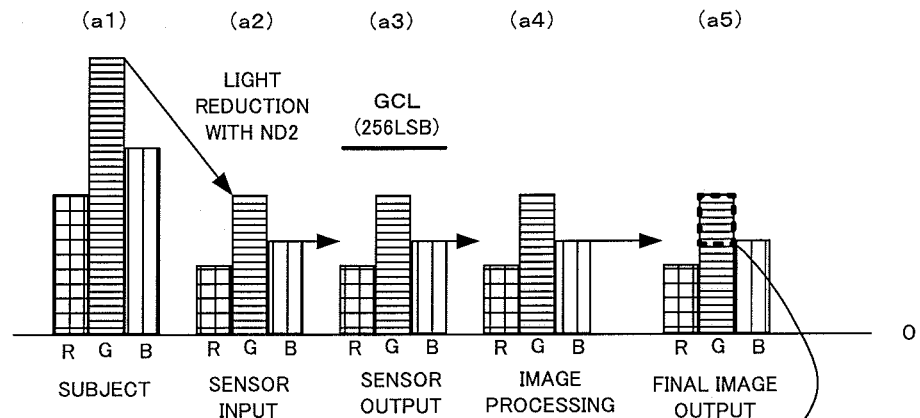
FIG. 2A to FIG. 2C are graphs for describing obtaining of correct exposure, in the digital camera of the first embodiment of the present invention, by carrying out divided exposure, and using minus gain on acquired images.
Figure 2B:
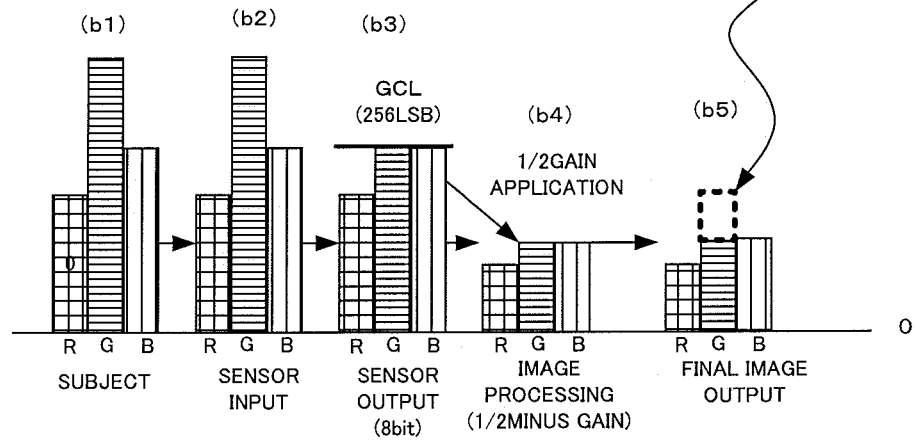
Figure 2C:
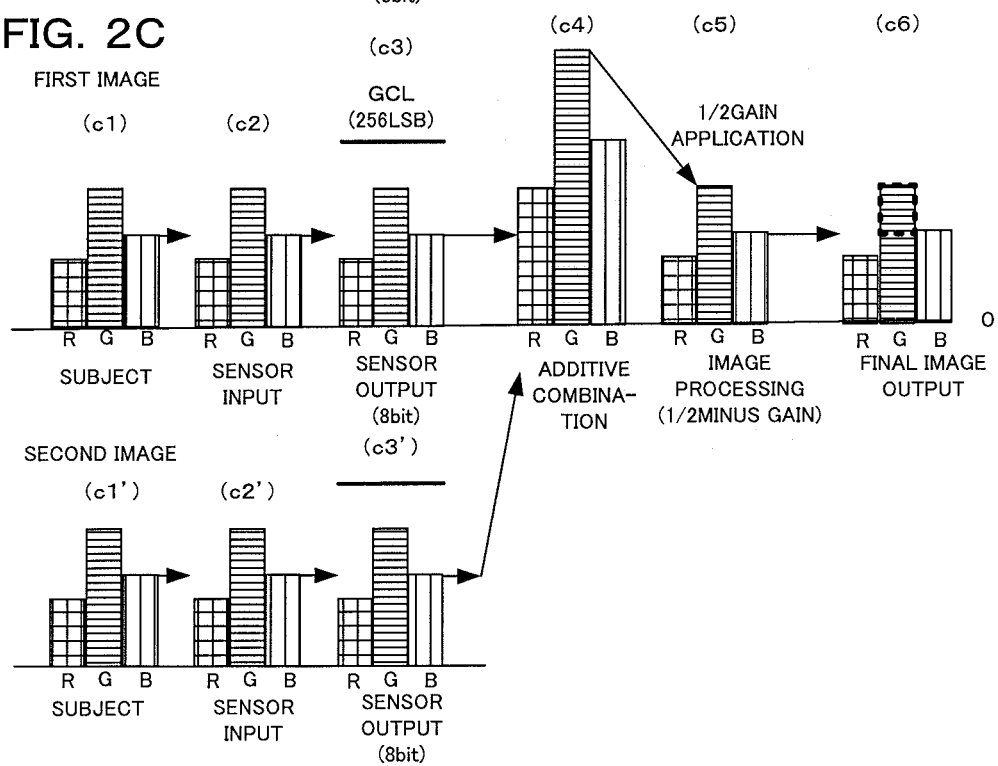

Next, the fact that it is possible to generate an image in which there is no saturation at the shutter speed that has been set by the user, as a result of shooting a subject using divided exposure in order to prevent saturation occurring, and applying minus gain, will be described using FIG. 2A to FIG. 2C. FIG. 2A to FIG. 2C show a common Bayer array image sensor, with high transmissivity color filters being arranged at R (red), G (green) and B (blue) wavelength regions at a front (subject) side of each pixel, with the horizontal axis in FIG. 2A to FIG. 2C representing R/G/B pixel values.

FIG. 2A shows one example for a case where an ND2 filter (light amount is reduced to ½) is inserted into the light path of the photographing lens, in the event of a high subject brightness. Specifically, (a1) shows one example of subject RGB components, (a2) shows brightness of input light to R/G/B pixels of the image sensor 4, and (a3) shows each output for output of R/G/B pixels of the image sensor 4. In this case, light amount is reduced to ½ by the ND2 filter, and output of each pixel of the image sensor 4 is proportional to ½ the subject brightness. Therefore, final pixel output (refer to (a5)) obtained by subjecting output of each pixel of the image sensor 4 to image processing by the image processing section 10 (refer to (a4)) becomes a value proportional to RGB components of the subject shown in (a1), and there are no blown out highlights in the image.

FIG. 2B shows one example of a case where, with the same subject brightness as FIG. 2A, the ND filter is not inserted, and instead minus gain of ½ is applied to R/G/B pixel output. Specifically, (b1) shows one example of the same subject RGB components as (a1), (b2) shows brightness of input light to R/G/B pixels of the image sensor 4, and (b3) shows each output for output of R/G/B pixels of the image sensor 4. In (b3), instead of the ND2 filter, multiplication by (½) is performed, as minus gain.

In this case, if light equivalent to or greater than saturation output of photodiodes within the image sensor 4, or saturation output of A/D converters inside or external to the sensor (full bit output, with the example shown in FIG. 2A to FIG. 2C, 8 bits=256 LSB) is input, output of the image sensor 4 is clipped at the saturation level. Since the image processing section 10 applies a minus gain to this clipped output (refer to (b4)), the final image output (referred to (b5)) has small saturated pixel output compared to the case where shooting is performed with the ND filter 2 inserted. That is, since, in the case of FIG. 2B, the G pixels become small, then the ratios of R/G/B of the final image output change compared to the ratios of R/G/B for the subject (refer to the broken line square of (a5) and the broken line square of (b5)).

Therefore, with the present invention, a plurality of images are acquired using divided exposure (two divided exposures with the example shown in FIG. 2C) so that output of the image sensor 4 is not saturated, as shown in FIG. 2C, additive combination is carried out for each of the plurality of required images, and an image is acquired by applying minus gain. In this way, it is possible to acquire an image with reduced output, without the occurrence of blown out highlights, similarly to if an ND filter had been inserted.

Specifically, (c1)-(c3) of FIG. 2C show subject brightness, image sensor input and image sensor output at the time of the first divided exposure, while (c1')-(c3') show subject brightness, image sensor input and image sensor output at the time of the second divided exposure. With two divided exposures, since each divided exposure time becomes ½, image sensor output also becomes ½, and sensor output is not clipped at the saturation level GCL (refer to (c3) and (c3')).

Once the first divided exposure is completed image data is read out and temporarily stored, then once the second divided exposure is completed image data is read out, and the additive combination section 14 performs additive combination of the two sets of image data that have been read-out (refer to (c4)). Once additive combination has been carried out, next the gain application section 15 applies minus gain (here, ½) to the image data that has been subjected to additive combination. The ratios of R/G/B for the final image output that has been subjected to minus gain are the same as the ratios of R/G/B for the subject (refer to (c6)). The portion shown by the dotted line square in (c6) is reproduced similarly to (a3).

Next, the flow of processing of the camera of this embodiment will be described using the flowchart shown in FIG. 3. This flowchart (the same applies to the flowcharts of FIG. 4 and FIG. 6 that will be descried later) is executed by the system control section 20 controlling each section in accordance with programs stored in the internal memory 31.

With this flowchart, as an initial state (START), a case is shown where the user has set shutter priority mode or manual mode as the camera exposure control mode, by means of the input IF 38. This is because in program mode or aperture priority mode, shutter speed is variable and divided exposure is not carried out.

Figure 3:
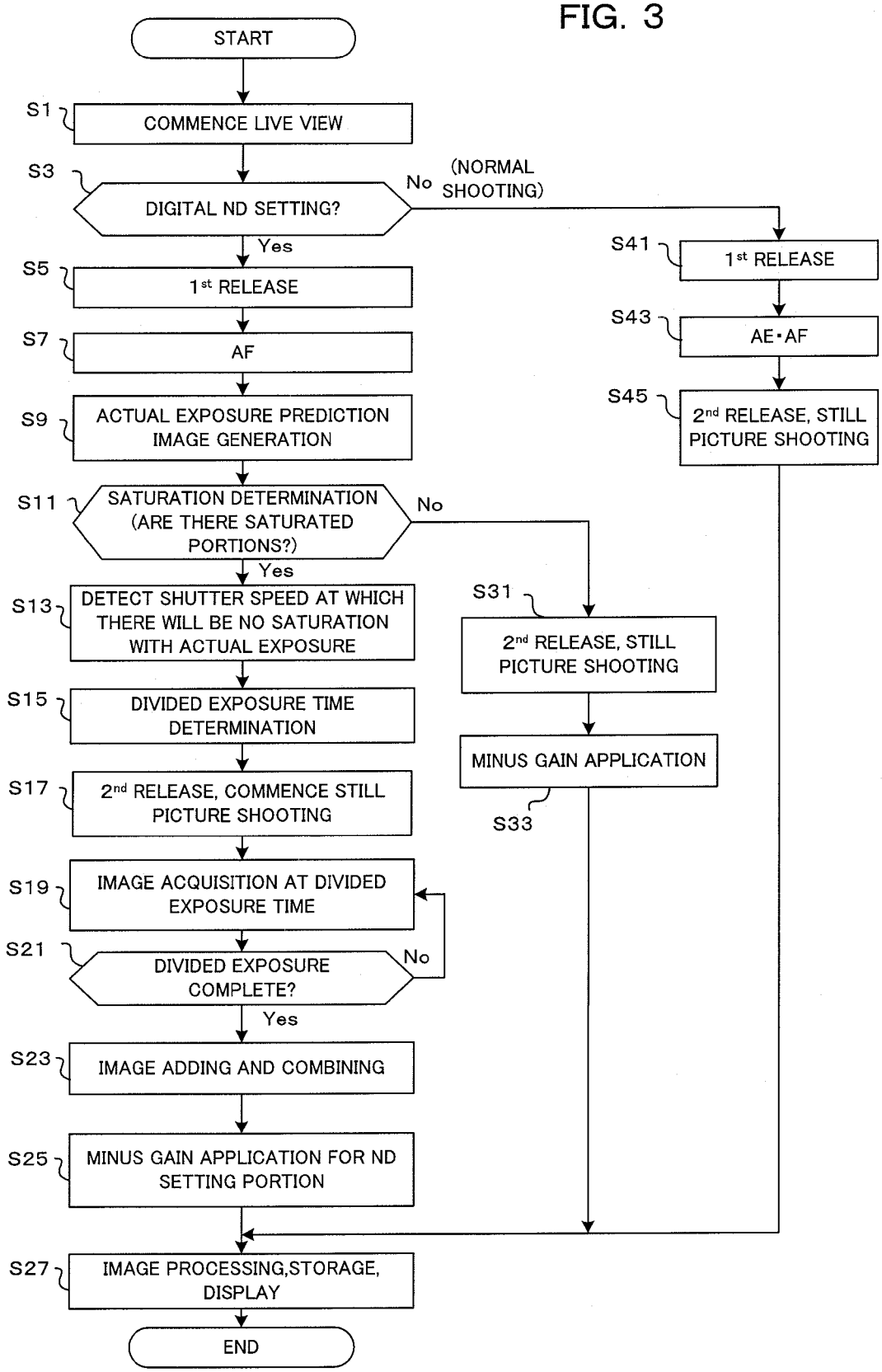
FIG. 3 is a flowchart showing digital ND mode operation of the camera of the first embodiment of the present invention.

If the flow of FIG. 3 is entered, first live view display is commenced (S1). Here, the image processing section 10 carries out image processing for live view display on the image data from the image sensor 4, and displays a live view image on the display section 37.

Once live view display has commenced, it is next determined whether or not the user has set digital ND mode (S3). In a case where the user wishes to apply image processing for a pseudo effect that is the same as inserting an ND filter so as to result in an image that does not have blown out highlights in the case of a high brightness image, the digital ND mode is set by means of the input IF 38, and the extent of light reduction (for example, ½, ¼, ⅛ etc.) is also set at this time.

If the result of determination in step S3 is that digital ND mode is not set, normal shooting is carried out in steps S41-S45. Specifically, it is determined whether or not a first release switch, that is turned on in accordance with a half press operation of a release button, has been turned on (S41), and if it is on AE and AF (automatic exposure control, automatic focus adjustment) are carried out (S43). It is then determined whether or not a second release switch, that is turned on in response to a full press operation of the release button, has been turned on (S45), and if it is on processing advances to step S27 after having carried out actual shooting.

If the result of determination in step S3 is that digital ND mode has been set, it is next determined whether or not the first release switch, that is turned on in response to a half press operation of the release button, has been turned on (S5). If the first release has been performed, AF (automatic focus adjustment) is carried out (S7). Here, the lens 2 is driven to an optimal focus position using image data for live view display that has been output from the image sensor 4.

Once AF has been carried out, next generation of an actual exposure prediction image is carried out (S9). Here, the actual exposure prediction section 18 predicts output of image data in the case where actual shooting has been carried out, using four shooting conditions, namely ISO sensitivity, aperture value, shutter speed and ND filter light reduction amount (for example ½, ¼, ⅛) at the time of actual shooting. Here, the ISO sensitivity used is an ISO sensitivity that has been set by the user taking into account image data for live view display, or ISO sensitivity for actual shooting that has been set in accordance with the camera AE (automatic exposure control) function. Also, the shutter speed used is a shutter speed for actual shooting that has been set by the user.

This actual exposure prediction image generation specifically creates an actual exposure prediction image based on the following equations (1) and (2), to correct outputs by the extent of differences between shooting conditions at the time of acquiring live view image data (ISO sensitivity, shutter speed, and aperture value) and the above-described four actual exposure shooting conditions.

$$\text{actual exposure prediction image}(x,y) = (\text{exposure difference}) \times \text{live view image}(x,y) \quad (1)$$

$$(\text{exposure difference}) = (\text{ISO sensitivity}\_A \div \text{ISO sensitivity}\_\text{live}) \times (F \text{ value}\_\text{live}^2 \div F \text{ value}\_A^2) \times (\text{shutter speed}\_A \div \text{shutter speed}\_\text{live}) \times (\text{digital } ND \text{ setting value}) \quad (2)$$

The reference numerals are as follows.
(x, y): pixel address of image data
ISO sensitivity_A: ISO sensitivity for actual exposure
ISO sensitivity_live: ISO sensitivity for live view
F value_A: F value for actual exposure
F value_live: F value for live view
shutter speed_A: shutter speed for actual exposure
shutter speed_live: shutter speed for live view Compared to at the time of actual shooting, there are many cases where the image data at the time of live view display is image data thinned from all pixels, or image data obtained by adding pixel outputs for each of a plurality of pixels. For this reason, the actual exposure prediction image that was generated in step S9 does not really constitute a prediction in pixel units of the image data at the time of actual shooting. However, in the case of a subject in which the blown out highlights phenomena is likely to arise, due to the fact that there can not be only a single pixel with high brightness, carrying out prediction based on image data for live view display is sufficient.

Once actual exposure prediction image generation has been carried out, saturation determination as to whether or not there are saturated portions is carried out (S11). Here, the saturation determination section 17 determines whether or not there are saturated pixels in part of the image data that has been read out from the image sensor 4.

If the result of determination in step S11 is that there are no saturated pixels, shooting for digital ND mode without divided exposure is carried out in steps S31 and S33. First, it is determined whether the second release switch, which is turned on in response to a full press operation of the release button, has been turned on (S31). If the result of this determination is that there has been a second release, actual shooting is carried out. In this step, shooting is carried out under shooting conditions, namely aperture, shutter speed, and ISO sensitivity, for actual exposure.

Once actual shooting has been carried out in step S31, application of minus gain is carried out (S33). In this step, minus gain equivalent to the digital ND setting value (for example, ½, ¼, ⅛) is applied by the gain application section 15 to image data that has been read out from the image sensor 4.

If the result of determination in step S11 is that there are saturated pixels, a shutter speed that will not saturate with actual exposure is detected (S13). Here, the divided exposure time detection section 19 searches for a shutter speed at which image data that has been shot with the aperture value, shutter speed and ISO sensitivity at the time of actual exposure will not be saturated.

When searching for the shutter speed in step S13, in the event that pixels (x, y) of a live view image currently being read out are not saturated, a shutter speed at which saturation does not occur at the time of actual shooting is detected from live view shooting conditions. On the other hand, in the event that pixels (x, y) of the live view image are saturated, a live view image is acquired again with exposure lowered, such as by stopping down the aperture, lowering ISO sensitivity or increasing shutter speed, to detect an exposure condition at which the live view image is not saturated. A shutter speed at which image data is not saturated when shooting at the aperture value, shutter speed and ISO sensitivity for actual exposure is calculated from this exposure condition.

If a shutter speed at which there is no saturation at the time of actual shooting has been detected in step S13, next determination of divided exposure time is carried out (S15). In this step a divided exposure time is determined from the detected shutter speed at which there is no saturation, and shutter speed for actual exposure. For example, a shutter speed that is an integer reciprocal of the shutter speed for actual exposure and is shorter than a shutter speed at which there is no saturation is determined as the divided exposure time. Also, if divided exposure time has been determined, a number of times for divided exposure is also determined by dividing the divided exposure time by the shutter speed at the time of actual shooting.

Next, it is determined whether or not the second release switch, that is turned on in response to a full press operation of the release button, has been turned on, and if the result of this determination is that there has been a second release operation shooting for actual exposure is commenced (S17). In this step, shooting is carried out under shooting conditions, namely aperture and ISO sensitivity, for actual exposure. Also, the shutter speed is set to the divided exposure time that was determined in step S15.

If shooting for actual exposure has commenced and the divided exposure time has elapsed, capture of image data for the divided exposure is carried out (S19). In this step image data is read out from the image sensor 4 every time a divided exposure is completed, and temporarily saved to the internal memory 33.

Once capture of image data for the divided exposure has been carried out, it is next determined whether or not divided exposure is complete (S23). In this step, it is determined whether or not exposure and readout have been repeated until the number of times for divided exposure that was determined in step S15 is reached. If the result of this determination is that divided exposure has not been completed, processing returns to step S19 and divided exposure is repeated.

If the result of determination in step S21 is that divided exposure has been completed, next image additive combination is carried out (S23). In this step, a plurality of image data that have been temporarily saved to the internal memory 33 are read out by the additive combination section 14, and additive combination of these image data is carried out.

Once image additive combination has been carried out, minus gain application according to the ND setting amount is carried out (S25). In this step, the image data that has been subjected to additive combination is multiplied by a minus gain of a digital ND setting value that has been set by the user, in the gain application section 15.

The processing order for the additive combination (S23) and the minus gain application (S25) may also be reversed. In the case where additive combination (S23) is carried out first, digital output of an image after additive combination has greater a high order bit with more adding of images. It is therefore necessary for a bit number for the high order bits of the memory section, for storing combined pixel output, to have a bit resolution that errs on the safe side, compared to the bit resolution for single image data, taking into consideration a number of additive combinations, so that the most significant bit (MSB) of the combined image is not clipped. In the arithmetic processing at the time of a summing operation, calculation is carried out using extended bits for the image data (digital value).

On the other hand, in the case where application of minus gain is carried out first (S23), since digital data is generated after the decimal point that arises after application of minus gain (also known as a component due to truncation of a numerical value to become a value after the decimal point due to division), the memory for storing images after minus gain application is required, with respect to the image data (digital value), to maintain bit number of low order bits after the decimal point so that a value after the decimal point is not clipped, taking into consideration bit shift (extended bits provided at the LSB side) due to a minus gain value with the ND setting value. Therefore, at least one of the additive combination section 14 and the gain application section 15 is provided with extended bit output to give sufficient bit precision.

Once minus gain application of the ND setting amount has been carried out in step S25, or if minus gain application has been carried out in step S33, or if second release processing was carried out in step S45, next image processing, storage and display are carried out (S27). In this step, the development processing section 16 carries out development processing of image data that was processed in steps S25 and S33 etc., and stores in the external memory 36, as well as displaying as a taken image on the display section 37.

In this manner, with the first embodiment of the present invention, an actual exposure prediction image is generated (S9), it is determined whether or not occurrence of saturated pixels is predicted based on this generated prediction image (S11), and in the event that occurrence of saturated pixels is predicted, then after carrying out divided exposure image addition is carried out. Therefore, for example, in situations such as carrying out slow shutter shooting or carrying out shooting under conditions of shallow depth of field by opening up the aperture at the time of shooting a high brightness subject, it is possible to shoot without blown out highlights occurring in a taken image, even when shooting under conditions where a taken image would normally have blown out highlights (saturation) if a light reduction filter (ND filter) was not fitted.

With this embodiment, at the time of divided exposure, time is controlled not only by means of shutter control by the mechanical shutter 3, but also in combination with an electronic shutter. Specifically, in a case where divided exposure time that has been determined by the divided exposure time detection section 19 is faster than the fastest shutter speed of the mechanical shutter 3 of the camera, exposure and readout are carried out using control by the electronic shutter. In this way it becomes possible to carry out divided exposure without saturation, even for a subject that is extremely bright (for example, the sun) etc.

Next, a second embodiment of the present invention will be described using FIG. 4 and FIG. 5. With the first embodiment, if the digital ND mode is set, an image for a case where an ND filter is inserted into the light path is artificially generated by additive combination of a plurality of image data that have been acquired by divided exposure. Conversely, with the second embodiment, if extended low ISO sensitivity mode is set, it is possible to artificially generate an image for a case where low ISO sensitivity has been set by additive combination of a plurality of image data that have been obtained by divided exposure. The extended low ISO mode is a mode for artificially generating an image equivalent to an image that has been taken by setting to a low ISO sensitivity (referred to as "extended low ISO") that is even lower than the lowest sensitivity to which the image sensor 4 can be set (referred to as "lowest ISO").

Figure 5A:
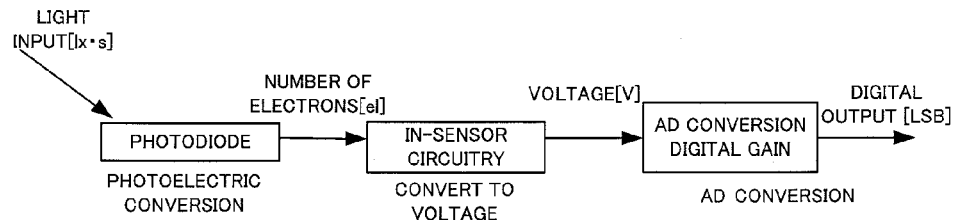
FIG. 5A to FIG. 5C are drawings showing a relationship between amount of light input to the image sensor and photoelectron amount, and a relationship between amount of light input to the image sensor and image output that has been digitized for ISO sensitivity setting, for the digital camera of a second embodiment of the present invention.
Figure 5B:
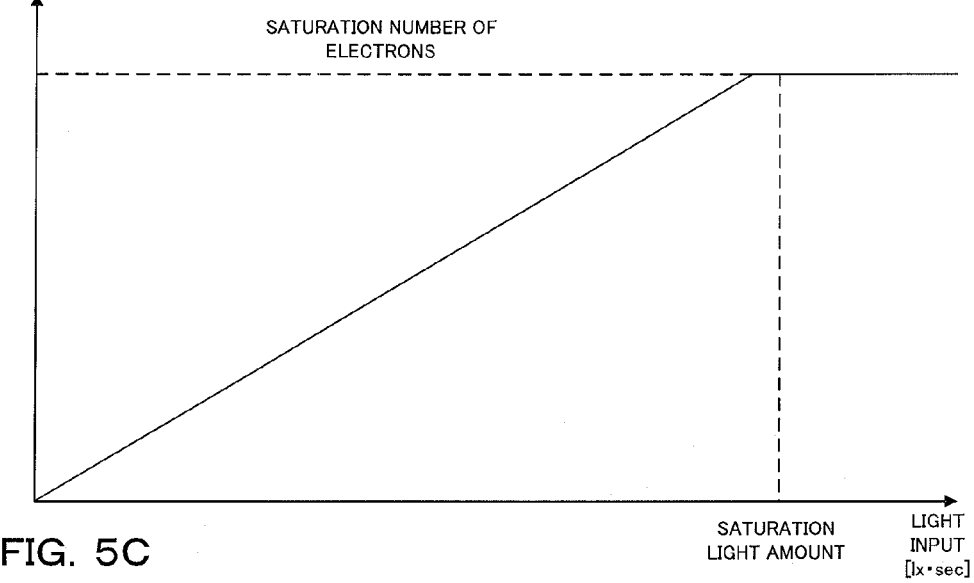
Figure 5C:
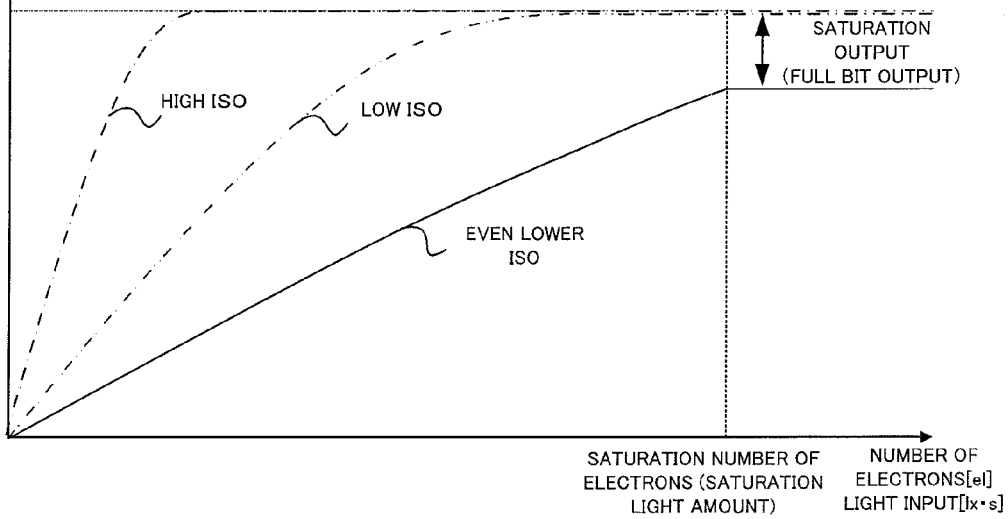

First, extended low ISO mode will be described using FIG. 5A to FIG. 5C. Low sensitivity setting is limited by a maximum value for number of electrons that can be photoelectrically converted in a single exposure by photodiodes corresponding to each pixel of the image sensor 4 (saturation number of electrons). As shown in FIG. 5A, with a digital camera, light input [lx·s] that is input to photodiodes is converted to electrons [el] by photoelectric conversion (refer to FIG. 5B), at the next stage is converted to a voltage value by internal sensor circuitry, and as shown in FIG. 5C, an A/D conversion section converts from an analog signal (voltage) to digital output [LSB] (Least Significant Bit). ISO sensitivity of a camera is determined by what LSB is output for a voltage value (number of electrons), namely lighting input. Digital output is saturated with a smaller number of electrons (light input) with higher ISO, and a greater number of electrons (light input) allocated to saturation output occurs with lower ISO. If ISO is lowered further, the number of electrons allocated to saturation output will exceed the saturation number of electrons (saturation light amount) leading to a loss of saturation output. The lowest ISO is therefore determined by the range in which saturation output can be obtained.

Thus, ISO sensitivity that can be set in the camera has a lower limit that is determined by performance of the image sensor 4 and permissible image quality as a camera. However, if the shutter speed and aperture value reflecting the user's intentions are determined, there may be situations where it is necessary to set ISO sensitivity to an ISO sensitivity that is lower that the lowest ISO. Therefore, with this embodiment it is possible to artificially realize low ISO sensitivity by image addition of a plurality of images that have been acquired by divided exposure.

The electrical structure of the camera of this embodiment is similar to the block diagram shown in FIG. 1, but the sections described below have the following functions for realizing the extended low ISO mode.

The gain application section 15 applies a difference gain to the lowest ISO at the time of extended low ISO mode setting. For example, with a camera having a minimum settable sensitivity of ISO 100, then in the case where extended low ISO of 25 has been set, pixel data is multiplied by a gain of ¼ (the equivalent to ISO25/ISO100). This minus gain may be a minus gain value itself that is set by the user by means of the input IF 38, or can be set as ISO sensitivity. Desired low sensitivity shooting is realized by applying this minus gain.

In the event that the camera has been set to extended low ISO mode, the saturation determination section 17 determines whether or not there are saturated pixels in the case where shooting has been carried out with shutter speed, aperture value and low sensitivity ISO at the time of actual shooting, based on image data that has been read out from the image sensor 4 for live view display immediately before actual shooting.

In the event that the camera is set in the extended low ISO mode and it has been determined by the saturation determination section 17 that there are saturated pixels at the time of actual shooting, the divided time detection section 19 detects shutter speed at which image output is not saturated in the case of shooting with the aperture value and the lowest ISO at the time of actual shooting.

If the saturation determination section 17 has determined that there are no pixels that are saturated at the time of actual shooting, the system control section 4 carries out shooting at the shutter speed and aperture value that have been set by the user. On the other hand, if it has been determined by the saturation determination section 17 that there are pixels that are saturated at the time of actual shooting, shooting is carried out a plurality of times with the shutter speed for the divided exposure time that has been detected by the divided exposure time detection section 19, the aperture value at the time of actual shooting, and the lowest ISO.

If it has been determined by the saturation determination section 6 that there are no pixels that are saturated, in the image data that has been read out, the system control section 20 performs shooting at the shutter speed, aperture value and ISO sensitivity that have been set by the user. Also, in a case where shooting is carried out in extended low ISO mode, shooting is carried out at the lowest ISO.

Also, in the first embodiment, it was described, using FIG. 2, that it was possible to generate an image with no saturation using divided exposure. With the second embodiment also, it is possible to obtain and artificially take an image at a low ISO by applying the same divided exposure processing.

Next, processing flow for the camera of this embodiment will be described using FIG. 4. With this embodiment also, similarly to the case of the first embodiment, a case where shutter priority mode or manual mode has been set as the camera exposure control mode is shown. The flow for this embodiment is the same as the flow for the first embodiment that was shown in FIG. 3, except that steps S3 and S9 have been changed to steps step S2 and S10. Steps that carry out the same processing will therefore be assigned the same step numbers and described simply, and description will center on points of difference.

Figure 4:
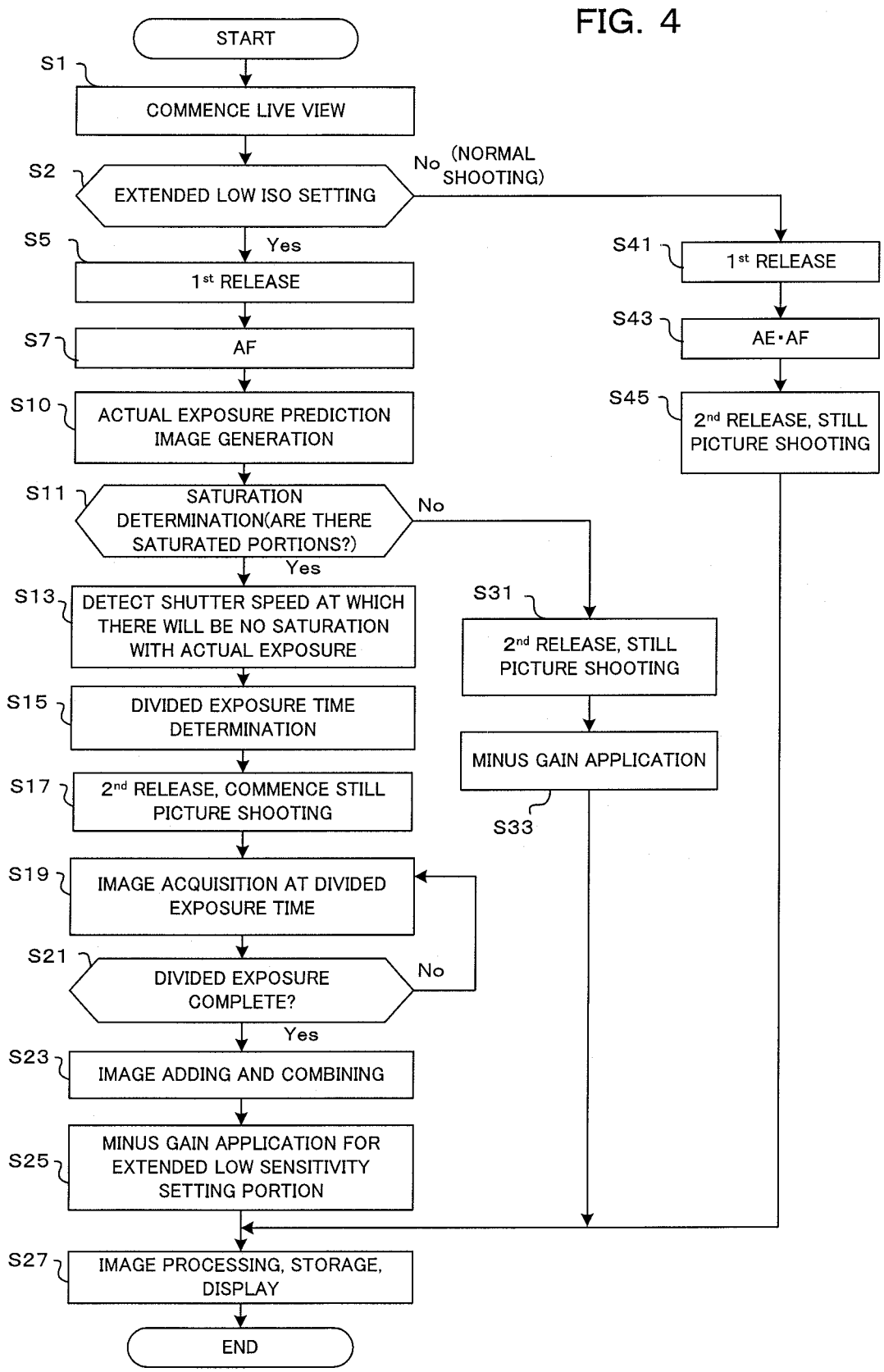
FIG. 4 is a flowchart showing extended low ISO mode operation of the camera of the first embodiment of the present invention.

If the flow shown in FIG. 4 is entered, first live view display is commenced (S1), and it is then determined whether or not the user has set extended low ISO mode (S2). In a case where the user wishes to artificially generate an image that is equivalent to that taken by setting to a lower ISO than the lowest sensitivity that can be set for the image sensor 4, extended low ISO mode is set via the input IF 38. If the result of this determination is that extended low ISO mode has not been set, normal shooting is executed in steps S41 to S45.

If the result of determination in step S2 is that extended low ISO mode has been set, AF is executed (S7) if there is a first release (S5).

Next, actual exposure prediction image generation is carried out (S10). In this step, the actual exposure time prediction section 18 predicts image data for the case where actual shooting is carried out using live view image output data, shooting conditions for the live view image (ISO sensitivity, F value and shutter speed), actual exposure shooting conditions other than ISO sensitivity (F value and shutter speed), and lowest ISO (lowest sensitivity determined by performance of the image sensor 4), using the following equations (3) and (4).

Since it is not possible to set extended ISO at the time of actual shooting, this calculation is carried out for determining whether there is saturation at the time of shooting at the lowest ISO which is necessary to achieve shooting at the lowest ISO.

$$\text{actual exposure prediction image}(x,y) = (\text{exposure difference}) \times \text{live view image}(x,y) \quad (3)$$

$$(\text{exposure difference}) = (\text{lowest ISO sensitivity}\_A \div \text{ISO sensitivity\_live}) \times (F \text{ value\_live}^2 \div F \text{ value}\_A^2) \times (\text{shutter speed}\_A \div \text{shutter speed\_live}) \quad (4)$$

The reference numerals are as follows.
(x, y): pixel address of image data
lowest ISO sensitivity_A: ISO sensitivity for actual exposure (lowest ISO)
ISO sensitivity_live: ISO sensitivity for live view
F value_A: F value for actual exposure
F value_live: F value for live view
shutter speed_A: shutter speed for actual exposure
shutter speed_live: shutter speed for live view If an actual exposure prediction image has been generated, the actual exposure prediction image that was generated by the actual exposure time prediction section 18 is subjected to saturation determination by the saturation determination section 17 (S11). If the result of this determination is that there is no saturation, actual shooting is carried out (S31), minus gain is applied (S33), and an image to which minus gain has been applied is stored in external memory and displayed on the display section 37 (S27).

The minus gain application of step S33 is minus gain to compensate for shortfall in extended low ISO that was set by the user, compared to the lowest ISO. Specifically, in the case where an extended ISO 25 has been set in a camera with a lowest sensitivity of ISO 100, minus gain of ¼ is applied (equivalent to ISO 25/100).

If the result of determination in step S11 is that there is saturation, a shutter speed that will result in no saturation of pixel output is detected using the same method as at the time of setting digital ND mode in the first embodiment (S13). Further, a divided exposure time is determined from the detected shutter speed at which there is no saturation and shutter speed for actual shooting (S15). This determination of divided exposure time, similarly to the case of the first embodiment, is determining a shutter speed that is an integer reciprocal of the shutter speed for actual shooting and is shorter than a shutter speed at which there is no saturation as the divided exposure time.

Next, actual shooting is commenced at the time the user presses down the release button fully (S17). Here, shooting is carried out with aperture set to the condition at the time of actual shooting, ISO sensitivity set to the lowest sensitivity, and shutter speed set to the divided exposure time that was determined in step S15. If exposure is completed, image data is read out from the image sensor 4 and held in internal memory (S19), and exposure and readout are repeated until the number of times for divided exposure, that was calculated by dividing the shutter speed at the time of actual shooting by the divided exposure time, is reached (S19 and S21 are repeatedly executed).

If the result of determination in step S21 is that divided exposure is complete, a plurality of image data that have been saved in the internal memory 33 are subjected to additive combination in the additive combination section 14 (S23). After additive combination, the image data is multiplied by the minus gain for only the amount of extended low sensitivty ISO value that was set by the user, in the gain application section 15 (S25). Once minus gain has been applied, development processing is carried out in the development processing section 16, and then stored in the external memory 36 as well as displayed on the display section 37 as a taken image (S27).

In this manner, with the second embodiment of the present invention, if extended low ISO mode is set an actual exposure prediction image is generated (S9), it is determined whether or not occurrence of saturated pixels is predicted based on this generated prediction image (S11), and in the event that occurrence of saturated pixels is predicted, then after carrying out divided exposure image addition is carried out. It is therefore possible to carry out shooting in a lower ISO condition than the lowest ISO sensitivity determined by the capability of a conventional image sensor. Specifically, by lowering ISO sensitivity below the lowest ISO sensitivity of an ordinary image sensor, a number of electrons assigned to saturation output exceeds a saturation number of electrons (saturation light amount), and image output fails without obtaining saturated output. As a result, it becomes impossible to acquire image output it is conventionally desired to obtain. With this embodiment, it is possible to shoot with exposure setting of a lower sensitivity than the lowest ISO sensitivity, without using a light reduction filter.

Next, a modified example of the second embodiment of the present invention will be described using FIG. 6. With the second embodiment, processing was executed on the basis of extended low ISO mode in the event that the user had set extended low ISO mode. Conversely, with this modified example, it is possible to set to extended low ISO mode with the camera in auto mode. For example, in the event that correct exposure with a bright subject cannot be obtained, in shutter priority mode, even with aperture closed down to the smallest aperture at the time of shooting, and with ISO sensitivity set to the lowest ISO, the camera automatically lowers the minimum ISO, that is, sets to extended low sensitivity ISO, so as to obtain correct exposure.

Figure 6:
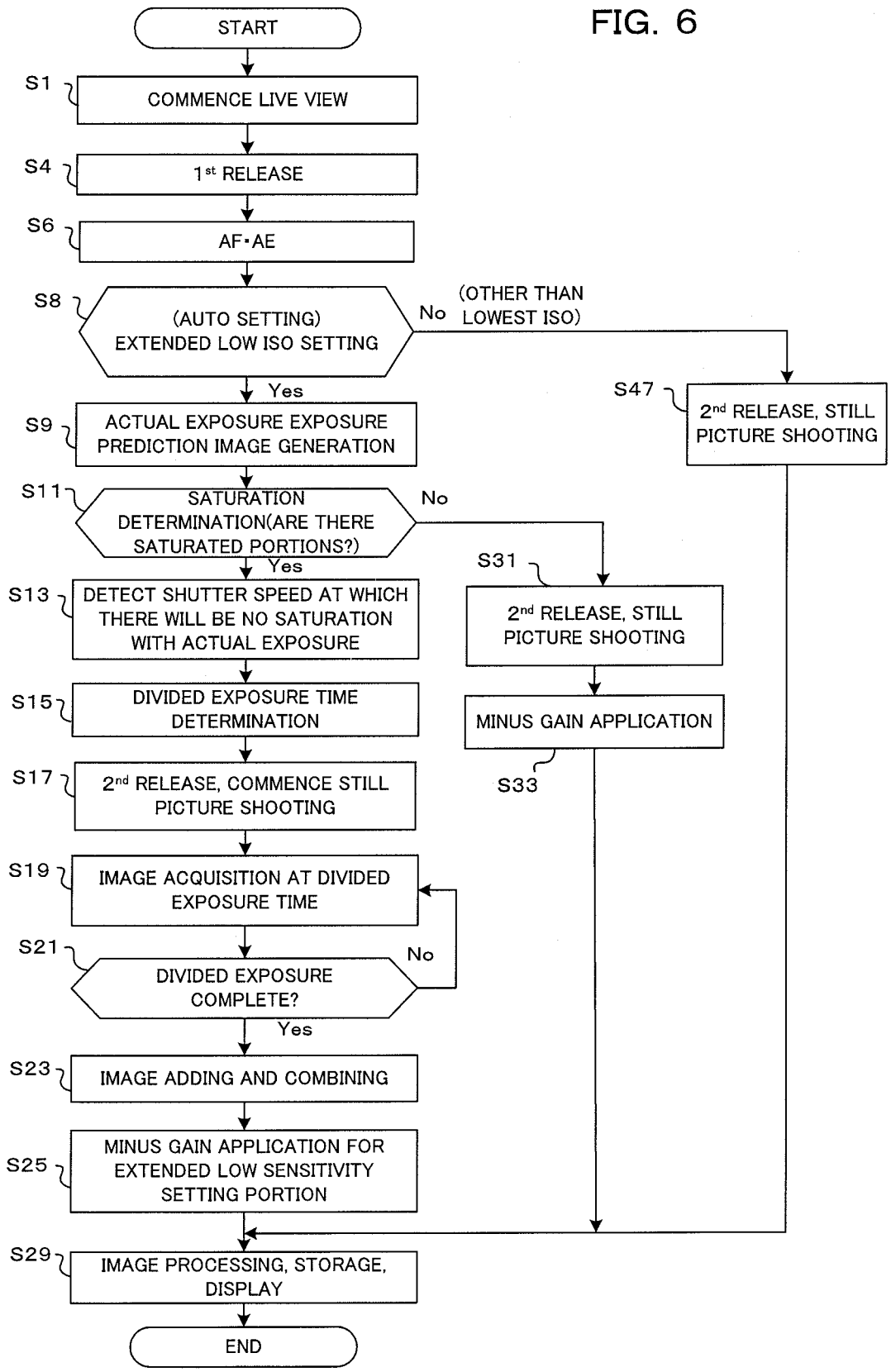
FIG. 6 is a flowchart showing a modified example of operation of the camera of the second embodiment of the present invention.

The flowchart shown in FIG. 6 shows camera operation of this modified example. With AE (auto exposure) after a first release operation, ISO sensitivity in order to obtain correct exposure is calculated, and it is then determined whether or not that ISO sensitivity is extended low sensitivity ISO. Subsequent processing is the same as the processing in FIG. 4. The flow of FIG. 6 is therefore the same as the flow shown in FIG. 4, except that steps S1-S7 and steps S41-S45 in FIG. 4 are replaced by step S1-S8 and steps 47 in FIG. 6.

With the operation based on the flowchart of FIG. 6, first live view display is commenced (S1). Next it is determined whether or not the user has performed a half press (first release) operation of the release button (S4). If the result of this determination is that the first release has been formed, AF and AE are executed (S6). In this step, the system control section 20 drives the lens and the aperture 2 within the imaging section 1, carries out movement to a focus position where the subject is focused on and adjustment exposure amount using the aperture, from image output successively obtained from the image sensor 4, and then calculates ISO sensitivity to give optimum exposure from shutter speed and aperture setting value.

Once AF and AE have been carried out, it is next determined whether or not extended low sensitivity ISO has been set (S8). In this step, it is determined whether or not the ISO sensitivity that was calculated in S6 is a value can be set for extended low sensitivity ISO.

If the result of determination in step S8 is that the ISO sensitivity requires extended low sensitivity ISO setting, then if there are saturated portions, a plurality of image data are acquired in steps S9-S29 by a divided exposure, and after carrying out additive combination image data similar to that acquired with low ISO artificially set is generated by applying minus gain. Also, if there are no saturated portions, image data similar to that when low ISO is artificially set is generated by applying minus gain to a still image in steps S31 and S33. Processing in these steps is as was described previously, and so detailed description is omitted.

On the other hand, if the result of determination in step S8 is that ISO sensitivity has not been set to extended low sensitivity ISO (S8 No), namely that shooting setting is ISO also, and calculated ISO sensitivity is greater than the lowest ISO sensitivity of the image sensor 4, processing transfers to step S45, and if the user has performed a full press operation of the release button (second release) exposure is commenced and shooting of a single still picture is carried out.

In this way, with this modified example, in the case where shooting has been performed with shooting conditions that have been set for actual exposure and with lowest sensitivity of the image sensor 4 set, the saturation determination section 17 determines whether or not pixel output of at least some of the image data is saturated. If the saturation determination section 17 determines that pixel output of at least some of the image data is saturated when the lowest sensitivity of the image sensor 4 has been set, sensitivity of the image sensor 4 to obtain correct exposure is calculated, then the gain application section 15 sets a minus gain calculated based on the sensitivity ratio of calculated value for sensitivity of the image sensor 4 with respect to the lowest sensitivity of the image sensor 4 to obtain correct exposure that is calculated by the saturation determination section 17, and applies this minus gain to the image data that is subjected to additive combination by the additive combination section 14. Therefore, even if the user has set extended low ISO mode, in the case where the calculated ISO sensitivity becomes a lower sensitivity than the lowest ISO sensitivity, the extended low ISO mode is automatically set, which is convenient.

As has been described above, with each of the embodiments and the modified example of the present invention, there are provided a saturation determination section 17 for, in the case of shooting with shooting conditions that have been set for actual exposure, determining whether or not at least some pixel output of image data is saturated, a divided exposure time detection section 19 for, if it has been determined by the saturation determination section 17 that at least some pixel output is saturated, detecting a divided exposure time at which pixel output will not be saturated, an additive combination section 14 for subjecting image data to additive combination, and a gain application section 15 for applying minus gain to image data that has been subjected to additive combination by the additive combination section 14. At the time of imaging in the imaging section, divided exposure is carried out at a divided exposure time to obtain a plurality of image data, minus gain is respectively applied to the obtained plurality of image data, and the additive combination section 14 performs additive combination of the image data to which minus gain has been applied. As a result, shooting with reduced light, equivalent to using an ND filter, is artificially made possible even if an ND filter is not used, or it is made possible to shoot at a lower sensitivity than the lowest ISO sensitivity that is determined by the image sensor capability etc., and there is no detrimental effect when shooting with normal sensitivity, such as degradation in shooting image quality.

In each of the embodiments and the modified example of the present invention, description has been given for the case where the image sensor 4 uses a conventional ordinary CMOS image sensor or CCD image sensor, but this is not limiting. For example, in the case of using an image sensor where read circuits are arranged in a row direction and a column direction of the image sensor, and it is possible to set respectively different divided exposure times for regions that are divided for every imaging area, such as every row, every column, every pixel, or a plurality of regions etc., saturation determination may be carried out for each of the above described imaging areas, and divided exposure time set in respective regions.

With a destructive readout type image sensor, such as an ordinary CMOS sensor or CCD image sensor, readout noise accumulates with increase in the number of times divided readout is performed. It is known that as a result, as the number of times divided readout is performed increases, image quality of a combined image formed by combining respectively read-out images is degraded. Consequently, by carrying out this type of control it becomes possible to keep the number of divided exposures for each region to a minimum to improve image quality of a combined image.

Also, in the case of using a CMOS image sensor, which is built into digital cameras currently available on the market, an operation is performed to sequentially reset charge storage from the upper line of the image and perform read out (rolling shutter). Therefore, in the case where a divided exposure time becomes faster than the fastest speed of a mechanical shutter, if divided exposure is carried out with an electronic shutter, since exposure time is different at the upper side and the lower side in a single image, image distortion (rolling distortion) will occur in cases such as where a subject moves during exposure or hand shake occurs. Rolling shutters of CMOS image sensors are ever increasing in speed, and while distortion is significantly suppressed, in principle, in order to prevent the occurrence of this distortion this problem may be solved by using a CCD image sensor or CMOS image sensor capable of having all pixels reset at once.

Also, with each of the embodiments and the modified example of the present invention, an example has been shown where, when carrying out divided exposure, divided exposure is performed with a mechanical shutter rather than an electronic shutter if the exposure time can be achieved by the mechanical shutter, but it is also possible to perform divided exposure shooting with an electronic shutter for all exposure times. If continuous shooting is carried out with a mechanical shutter, an exposure fall off of a few tens of milliseconds will arise between divided exposures, and so for a subject that is moving during actual shooting the image may become unnatural. On the other hand, since there is no exposure fall off with an electronic shutter, it is possible to prevent a combined image becoming unnatural Also, with this embodiment, a device for taking pictures has been described using a digital camera, but as a camera it is also possible to use a digital single lens reflex camera, a mirrorless camera or a compact digital camera, or a camera for movie use such as a video camera, and further to have a camera that is incorporated into mobile device such as a mobile phone, a smartphone, a mobile information terminal (PDA: Personal Digital Assistant), a personal computer (PC), tablet type computer, or game console etc. It is also possible to apply the present invention to a device that requires dynamic range (range of light and dark) for subject brightness, such as a vehicle mounted camera or security camera.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an imaging section, including an image sensor for forming a subject image and outputting image data,
   a saturation determination section for, in the case where imaging has been carried out under conditions that have been set for actual exposure, determining whether or not pixel output of at least some of the image data is saturated,
   a divided exposure time detection section for, in the event that it has been determined by the saturation determination section that at least some pixel outputs are saturated, detecting a divided exposure time at which the pixel outputs are not saturated, and an image processing section for applying image processing to image data that has been acquired by the imaging section, wherein the image processing section is provided with an additive combination section for carrying out additive combination of image data, and a gain application section for applying minus gain to image data that has been subjected to additive combination by the additive combination section, and the additive combination section, at the time of imaging in the imaging section, respectively additively combines a plurality of image data, that have been acquired by divided exposure at the divided exposure time, to create combined image data, and the gain application section applies minus gain to the combined image data to create taken image data.

2. The imaging device of claim 1, wherein:

the imaging section further comprises a mechanical shutter, and when the divided exposure time that has been detected by the divided exposure time detection section can not be controlled by the mechanical shutter due to being a high speed exposure time, the divided exposure operation is controlled by electronic shutter control of the image sensor without driving the mechanical shutter.

3. The imaging device of claim 1, wherein:

the image sensor contained in the imaging section is an image sensor capable of controlling exposure time for every pixel or every line, and pixels or lines that have been determined as being saturated by the saturation determination section are subjected to divided exposure, while pixels or lines that have been determined as being not saturated are read out with a single exposure.

4. The imaging device of claim 3, wherein:

the gain application section sets a minus gain calculated based on arbitrary light reduction amount that has been input for setting by a user, and applies the minus gain to output of image data that has been subjected to additive combination by the additive combination section.

5. The imaging device of claim 3, wherein:

the gain application section sets a minus gain calculated based on a sensitivity ratio for a sensitivity setting value setting input by the user with respect to lowest sensitivity of the image sensor, and applies the minus gain to output of image data that has been subjected to additive combination by the additive combination section.

6. The imaging device of claim 3, further comprising:

an actual exposure prediction section, for calculating a sensitivity setting value for the image sensor to acquire correct exposure, based on shooting conditions that have been set for actual exposure;

wherein, the saturation detection section further, with shooting conditions at a sensitivity setting value of the image sensor obtained by the actual exposure prediction section, determines whether or not at least some pixel output of the image data is saturated, when the saturation determination section has determined that at least some of the pixel output of the image data is saturated, when the lowest sensitivity of the image sensor has been set by the actual exposure prediction section, calculates sensitivity of the image sensor to become than the lowest sensitivity setting of the images sensor to obtain correct exposure; and the gain application section sets minus gain calculated based on calculated value for sensitivity of the image sensor to obtain correct exposure that was acquired by the actual exposure prediction section and sensitivity ratio with resect to the lowest sensitivity of the image sensor, and applies the minus gain to image data that has been subjected to additive combination by the additive combination section.

7. The imaging device of claim 6, wherein:

the actual exposure prediction section generates predicted image data conforming to shooting conditions that have been set for actual exposure, based on live view image data;

the saturation determination section determines whether or not at least some pixel output, of the predicted image data, is saturated; and if the saturation determination section determines that at least some pixel output of the predicted image data is saturated, the divided exposure time detection section detects a divided exposure time at which the pixel output is not saturated, and a number of divisions.

8. The imaging device of claim 7, wherein:

the saturation determination section determines whether or not at least some pixel output, of the live view image data, is saturated;

the actual exposure prediction section, if the saturation determination section has determined that pixel output is saturated in the live view image data, performs setting to lower exposure so as to achieve a state where the saturation determination section will not detect saturation; and the actual exposure prediction section generates predicted image data that is based on shooting conditions that had been set for actual exposure, from the live view image data that has had exposure lowered.

9. The imaging device of claim 1, wherein:

the additive combination section and/or the gain application section is further provided with extended bit output to achieve sufficient bit precision; and at the time of an addition operation by the additive combination section, and/or at the time of a gain application operation by the gain application section, operation is carried out using the additive combination section and/or the extended bit output, so the information of the image data is not lost.

10. An imaging device, comprising:

an imaging section, including an image sensor for forming a subject image and outputting image data, a saturation determination section for, in the case where imaging has been carried out under conditions that have been set for actual exposure, determining whether or not pixel output of at least some of the image data is saturated, a divided exposure time detection section for, in the event that it has been determined by the saturation determination section that at least some pixel outputs are saturated, detecting a divided exposure time at which the pixel outputs are not saturated, and an image processing section for applying image processing to image data that has been acquired by the imaging section, wherein the image processing section is provided with a gain application section for applying minus gain to respective divided exposure image data that as been imaged at the divided exposure time detected by the divided exposure time detection section, and an additive combination section for subjecting the divided exposure image data, that has had minus gain applied, to additive combination, and the additive combination section, at the time of imaging in the imaging section, additively combines image data, that have been acquired by dividing exposure at the divided exposure time, and to which minus gain has been respectively applied by the gain application section, to create combined image data.

11. The imaging device of claim 10, wherein the imaging section further comprises a mechanical shutter, and when the divided exposure time that has been detected by the divided exposure time detection section cannot be controlled by the mechanical shutter due to being a high speed exposure time, the divided exposure operation is controlled by electronic shutter control of the image sensor without driving the mechanical shutter.

12. The imaging device of claim 10, wherein the image sensor contained in the imaging section is an image sensor capable of controlling exposure time for every pixel or every line, and pixels or lines that have been determined as being saturated by the saturation determination section are subjected to divided exposure, while pixels or lines that have been determined as being not saturated are read out with a single exposure.

13. The imaging device of claim 12, wherein:

the gain application section sets a minus gain calculated based on arbitrary light reduction amount that has been setting input by a user, and applies the minus gain to output of image data that has been subjected to additive combination by the additive combination section.

14. The imaging device of claim 12, wherein:

the gain application section sets a minus gain calculated based on a sensitivity ratio for a sensitivity setting value setting input by the user with respect to lowest sensitivity of the image sensor, and applies the minus gain to output of image data that has been subjected to additive combination by the additive combination section.

15. The imaging device of claim 12, wherein:

an actual exposure prediction section, for calculating a sensitivity setting value for the image sensor to acquire correct exposure, based on shooting conditions that have been set for actual exposure, wherein, the saturation detection section further, with shooting conditions at a sensitivity setting value of the image sensor obtained by the actual exposure prediction section, determines whether or not at least some pixel output of the image data is saturated, when the saturation determination section has determined that at least some of the pixel output of the image data is saturated, when the lowest sensitivity of the image sensor has been set by the actual exposure prediction section, calculates sensitivity of the image sensor to become lower than the lowest sensitivity setting of the images sensor to obtain correct exposure, and the gain application section sets minus gain calculated based on calculated value for sensitivity of the image sensor to obtain correct exposure that was acquired by the actual exposure prediction section and sensitivity ratio for the lowest sensitivity of the image sensor, and applies the minus gain to image data that has been subjected to additive combination by the additive combination section.

16. The imaging device of claim 15, wherein:

the actual exposure prediction section generates predicted image data that is based on shooting conditions that had been set for actual exposure, based on live view image data;

the saturation determination section determines whether or not at least some pixel output, of the predicted image data, is saturated; and if the saturation determination section determines that at least some pixel output of the predicted image data is saturated, the divided exposure time detection section detects a divided exposure time out which the pixel output is not saturated, and a number of divisions.

17. The imaging device of claim 16, wherein the saturation determination section determines whether or not at least some pixel output, of the live view image data, is saturated;

the actual exposure prediction section, if the saturation determination section has determined that pixel output is saturated in the live view image data, performs setting to lower exposure so as to achieve a state where the saturation determination section will not detect saturation; and the actual exposure prediction section generates predicted image data that is based on shooting conditions that had been set for actual exposure, from the live view image data that has had exposure lowered.

18. The imaging device of claim 10, wherein:

the additive combination section and/or the gain application section is further provided with extended bit output to achieve sufficient bit precision; and at the time of an addition operation by the additive combination section, and/or at the time of a gain application operation by the gain application section, operation is carried out using the adding section and/or the extended bit output, so the information of the image data is not lost.

19. An imaging method wherein:

an image forming step forms a subject image using an image sensor and outputting image data, a saturation determination step, in the case where imaging has been carried out under conditions that have been set for actual exposure, determines whether or not pixel output of at least some of the image data is saturated, a divided exposure time detection step, in the event that it has been determined in the saturation determination step that at least some pixel outputs are saturated, detects a divided exposure time at which the pixel outputs are not saturated, and an image processing step applies image processing to image data that has been acquired in the imaging section, wherein the image processing step is provided with an additive combination step that carries out additive combination of image data, and a gain application step that applies minus gain to image data that has been subjected to additive combination in the additive combination step, and the additive combination step, at the time of the imaging step, further additively combines a plurality of divided image data, that have been acquired by dividing exposure at the divided exposure time, and have had minus gain applied, to create taken image data.

20. An imaging method wherein:

an image forming step forms a subject image using an image sensor and outputting image data, a saturation determination step, in the case where imaging has been carried out under conditions that have been set for actual exposure, determines whether or not pixel output of at least some of the image data is saturated, a divided exposure time detection step, in the event that it has been determined in the saturation determination step that at least some pixel outputs are saturated, detects a divided exposure time at which the pixel outputs are not saturated, and an image processing step applies image processing to image data that has been acquired in the imaging section, wherein the image processing step is provided with a gain application step that applies minus gain to image data, and an additive combination step that carries out additive combination of image data, after having applied minus gain in the gain application step, and the additive combination step, at the time of the imaging step, performs additive combination of image data, that have been acquired by dividing exposure at the divided exposure time, and that have respectively had minus gain.

* * * * *